(12) United States Patent
Guertin et al.

(10) Patent No.: US 8,101,085 B2
(45) Date of Patent: Jan. 24, 2012

(54) PROCESS FOR TREATING ANIMAL HUSBANDRY EFFLUENT SLURRY BY PRE-TREATMENT AND ELECTROFLOTATION

(75) Inventors: Simon Guertin, Mont St-Hilaire (CA); Daniel Massé, Sherbrooke (CA); François Lamarche, St-Pie (CA)

(73) Assignee: Agriculture and Agri-Food Canada, Ontario (CA)

( * ) Notice: Subject to any disclaimer, the term of this patent is extended or adjusted under 35 U.S.C. 154(b) by 930 days.

(21) Appl. No.: 12/149,842

(22) Filed: May 8, 2008

(65) Prior Publication Data
US 2009/0277840 A1 Nov. 12, 2009

(51) Int. Cl.
*C02F 1/465* (2006.01)
*C02F 1/52* (2006.01)
*C02F 1/56* (2006.01)

(52) U.S. Cl. ........ 210/703; 210/705; 210/707; 210/724; 210/725; 210/726; 210/727; 210/734; 210/806; 210/748.01; 205/757

(58) Field of Classification Search .......... 210/703, 210/705, 707, 724, 725, 726, 727, 734, 806, 210/748.01; 205/757
See application file for complete search history.

(56) References Cited

U.S. PATENT DOCUMENTS

| | | | |
|---|---|---|---|
| 3,975,245 A | 8/1976 | Bergquist et al. | |
| 3,975,247 A | 8/1976 | Stralser | |
| 4,214,987 A | 7/1980 | Clemens | |
| 4,654,071 A | 3/1987 | Müller | |
| 4,865,975 A * | 9/1989 | Lewandowski et al. | 435/68.1 |
| 6,852,226 B2 | 2/2005 | Hiro et al. | |
| 2002/0166819 A1 | 11/2002 | Dutil et al. | |

FOREIGN PATENT DOCUMENTS

| | | | |
|---|---|---|---|
| GB | 2025922 A * | 1/1980 | |
| WO | WO 01/19735 A1 | 3/2001 | |
| WO | WO 01/85617 | 11/2001 | |

* cited by examiner

*Primary Examiner* — Thomas M Lithgow
(74) *Attorney, Agent, or Firm* — Jacobson Holman PLLC

(57) ABSTRACT

Described is a process for treating an animal husbandry effluent slurry, such as hog manure, containing suspended solid particles. The process includes a) providing a liquid portion of the effluent, b) diluting the liquid to a Newtonian fluid, c) assuring the pH is under 10, d) adding to the fluid i) a soluble salt of alkaline earth metal (e.g. $CaCl_2$) and ii) an insoluble basic salt of the same alkaline earth metal (e.g. $CaCO_3$) to balance available cations and promote agglomeration of the suspended solid particles, e) adding a cationic coagulant to obtain a pre-treated destabilized colloid mixture with zero zeta potential value, and f) performing electroflotation to obtain a treated liquid and floated solids.

25 Claims, 8 Drawing Sheets

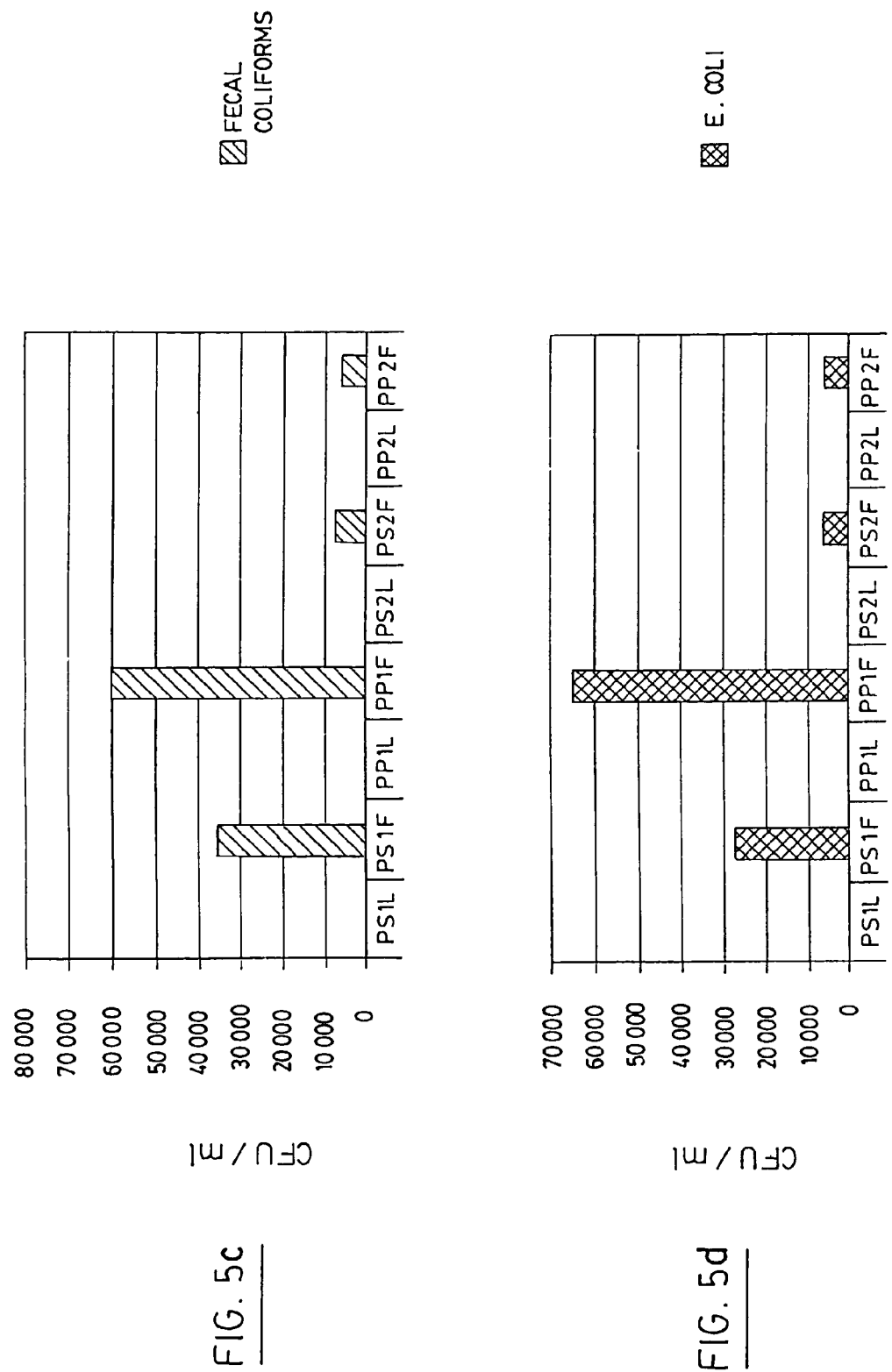

PROCESS FOR TREATING ANIMAL HUSBANDRY EFFLUENT SLURRY BY PRE-TREATMENT AND ELECTROFLOTATION

FIELD OF THE INVENTION

The present invention relates to the field of animal husbandry effluent slurry treatment and more specifically to a process for treating animal husbandry effluent slurry by pre-treatment and electroflotation steps.

BACKGROUND OF THE INVENTION

Effluent manure is an example of an animal husbandry effluent slurry on which it is desirable to perform separation and purification treatments.

Some types of manure, such as those of the porcine variety, present environmental risks. The high volume of liquid porcine manure produced in some regions coupled with its use as fertilizer in local fields, results in increased levels of phosphorus, potassium and heavy metals in the soil. This may increase the soil's susceptibility to allowing such minerals to leach into drainage waters and run-off streams. In addition, many types of manure give off disagreeable odours, which are particularly unpleasant when the manure applications are located in proximity to urban zones. There are several disposal and processing methods for manure. Flotation methods for removing solids from the liquid phase are also known in the art. Bubble injection uses injected air to bind to particles and bring them to the surface of the liquid. In particular, electroflotation employs an anode and a cathode to stimulate dissolved gas to form small bubbles to bring solids to the surface of the liquid. Electroflotation has been used in some effluent treatment processes.

Chemical treatments of manure are also used for ameliorating the separation and neutralizing unwanted or harmful compounds. Acids, bases, salts, coagulants and flocculants have been used as chemical additives in the prior art. These chemicals are often added in haphazard or non-optimal combinations to precipitate some suspended solids.

In the prior art patent and scientific literature, there are several processes that attempt to treat, purify or clarify manure or other effluent slurries to improve the solid-liquid separation by using an electrochemical procedure.

U.S. Pat. No. 6,852,226 (HIRO et al.) describes a process for the treatment of sewage waters including pre-treatment by fermentation, addition of chemical compounds such as HClO, $Cl_2$, $CaCl_2$ and/or $Fe^{3+}$, and electroflotation.

U.S. Pat. No. 4,214,987 (CLEMENS) describes the treatment of used water from the food industry, including the addition of $H_2SO_4$ or HCl, addition of a flocculant and an electrochemical treatment by bubbles.

U.S. Pat. No. 3,975,247 (STRALSER) describes the treatment of sewage water including diluting the water to produce a solid-liquid solution in a 1:20 ratio that is flowable with the solids in suspension. This solution is macerated and sent to an electrolysis cell. Chemical compounds, such as chloride salts of Na, K, Ca or Mg may be added to the solution.

U.S. Pat. No. 4,654,071 (MIILLER) describes an electrolysis step using copper electrodes in order to treat liquid manure, preferably so as to contain few bubbles. It is described that it is preferable not to pre-treat the manure and that the manure is in the form of a slurry having a feces to urine ratio of approximately 10:1.

United States patent application published under No. 2002/0166819 (WATANABE) describes a manure treatment process including a biological treatment step followed by an electrochemical treatment. Flocculants, coagulants and salts may be added. This patent application also describes an electroflotation step.

U.S. Pat. No. 3,975,247 (STRALSER) describes the treatment of manure by the addition of coagulants/flocculants such as polymers and lime and then electro-coagulation using iron and/or aluminium electrodes.

International application published under No. WO 01/19735 (DEBILLEMONT) describes the treatment of manure by electroflotation using soluble electrodes made of Mg in order to produce the complexes $MgNH_4PO_4$. Chemicals may be added to aid the separation.

International application published under No. WO 01/85617 (TIERNY) describes a process for treating effluent containing nitrogen and phosphates, by adding a base, adjusting the pH, and then electroflotation.

The article "Electrode processes in static electrolysis of sewage from livestock farm" (DRABENT et al.), describes in its abstract the treatment of manure by dilution and then electrolysis to stimulate the coagulation of the solid particles for separation. CaO can be used in order to vary the intensity of the current in the electrolytic system.

There are a variety of processes known in the art for treating animal husbandry effluent slurries using electroflotation. The prior art of effluent slurry solid-liquid separation with electroflotation presents disadvantages related to the efficiency and effectiveness in destabilizing the colloidal liquid and in concentrating contaminants such as phosphorus in the solid phase, improving odour, reducing costs and/or improving clarity of the liquid phase. The prior art has a number of disadvantages in terms of process efficiency, scalability, robustness and/or effectiveness.

There is currently a need for an improved process for treating animal husbandry effluent slurries, such as manure, to overcome at least some of the above-mentioned disadvantages.

SUMMARY OF THE INVENTION

The present invention responds to the above-mentioned need by providing processes for treating animal husbandry effluent slurries by pre-treatment and electroflotation.

Accordingly, the present invention provides a process for treating an animal husbandry effluent slurry comprising suspended solid particles, the process comprising the steps of:
  a) providing a liquid portion of the effluent slurry;
  b) assuring the liquid portion of step a) is diluted to a Newtonian fluid;
  c) assuring the pH of the Newtonian fluid obtained in step b) is under 10.0;
  d) adding to the fluid of step c):
     i) a soluble salt of alkaline earth metal; and
     ii) an insoluble basic salt of the same alkaline earth metal as step i);
        to balance available cations and promote agglomeration of the suspended solid particles in the fluid of step c);
  e) adding a cationic coagulant to obtain a pre-treated destabilized colloid mixture having a zeta potential of about zero; and
  f) subjecting the pre-treated mixture obtained in step f) to electroflotation to obtain a treated liquid and floated solids.

The above process uses the pre-treatment steps a) to e) followed by the electroflotation step f). The pre-treatment steps are tailored to increase the efficiency and quality of the separation, particularly by focusing on the surface and charge characteristics of the colloidal liquid to destabilize the colloid particles to facilitate efficient electroflotation.

In one embodiment of the present invention, the animal husbandry effluent slurry is hog manure comprising hog excrement and urine. The manure may be taken from a pre-pit.

In another embodiment of the present invention, step a) includes subjecting the effluent slurry to mechanical separation to obtain a rough solids portion and the liquid portion. Optionally, in step a) the mechanical separation is performed by filtration using a mesh having 2 mm openings to remove the rough solids portion.

In another embodiment of the present invention, step b) includes diluting a pseudo-plastic liquid portion to obtain the Newtonian fluid.

In another embodiment of the present invention, in step c) the pH is adjusted by adding an organic acid. The organic acid may be acetic acid and the pH may be adjusted to between about 6 and about 7.

In another embodiment of the present invention, the available cations of step d) comprise $Na^+$ and an alkaline earth metal cation, and the soluble salt is added in an amount so that the charge of the alkaline earth metal cations is from over equal to double the charge of the $Na^+$ cations. The soluble salt may be added so that the charge of the alkaline earth metal cations is double the charge of the $Na^+$ cations.

In another embodiment of the present invention, prior to step d), there is a step of determining the concentration of available cations. Optionally, this step of determining the concentration of available cations is performed by ion specific electrodes. Salts may be added to balance the available cations and promote agglomeration of the suspended solid particles.

In another embodiment of the present invention, in step d) there is a further step of adding a chelating agent before sub-steps i) and ii). Optionally, the chelating agent is added according to the concentration of $K^+$ present into the suspension. Optionally, the chelating agent is EDTA. Optionally, the soluble salt of alkaline earth is $CaCl_2$ and the insoluble basic salt is $CaCO_3$. The insoluble basic salt is added in double the amount as the soluble salt.

In another embodiment of the present invention, in step e) the coagulant is a cationic polymer of molecular weight between about 50,000 and about 200,000.

In another embodiment of the present invention, after adding the cationic coagulant a cationic flocculant is added. Optionally, the flocculant is added in a proportion ranging between about 1:3 and about 1:30, to obtain the pre-treated destabilized colloid mixture having a zeta potential of about zero. The flocculant may be a cationic polymer of molecular weight over about 200,000 and may be a polyacrylamide-based polymer.

In another embodiment of the present invention, in step f) the electroflotation uses substantially non consumable electrodes. Optionally, the electrodes include an anode and a cathode, the anode being in the form of rods and the cathode being in the form of a flat mesh, wherein the anode is arranged about 9 mm below the cathode in spaced and parallel relation thereto. Optionally, the current density used for the electroflotation is between about 25 mA/cm² and about 65 mA/cm².

In another embodiment of the present invention, the process further includes after step e) and before step f) the additional step of letting the pre-treated mixture rest at a constant temperature. Optionally, the pre-treated mixture is let to rest at a temperature between about 25° C. and about 30° C. for at least about 20 minutes. In an embodiment of the present invention, the animal husbandry effluent slurry may contain organic matter up to about 225,000 mg/L (as TCOD).

In another embodiment of the present invention, the process is performed by batch. In another embodiment of the present invention, the steps a) to e) are performed at a temperature of about 15° C.

Diluting the liquid to a Newtonian zone presents advantages related to the subsequent chemical addition steps and the electroflotation, by improving the flowability of the colloid, the destabilization of the colloid and/or the predictability of the treatment process.

Adding the salts enables advantages for the solid-liquid separation, by improving the destabilisation of the colloid and the electroflotation.

BRIEF DESCRIPTION OF THE DRAWINGS

FIGS. 5a-5d are graphs of coliform content for treated manure liquid and solid portions.

DETAILED DESCRIPTION OF THE PREFERRED EMBODIMENTS

Figure 1:
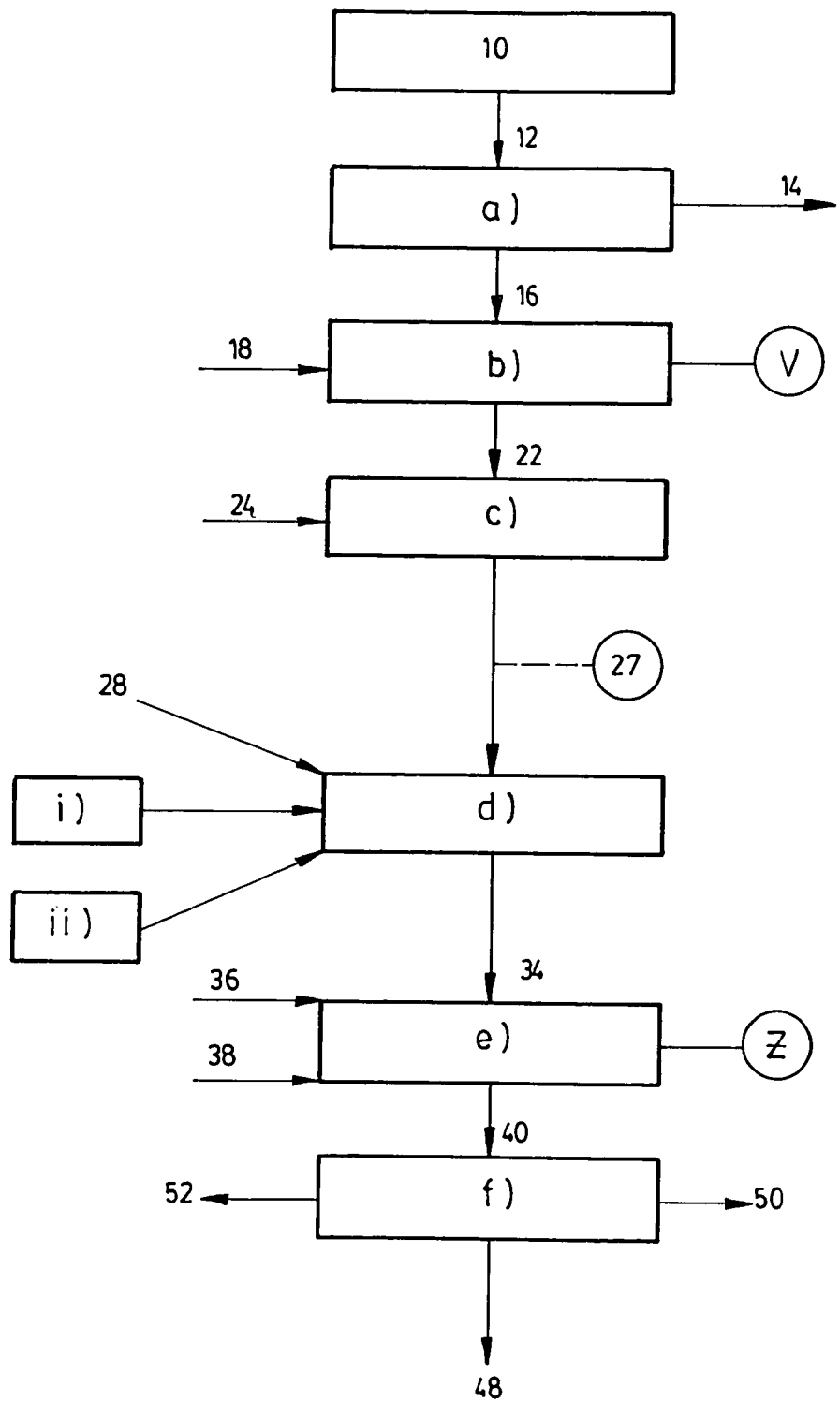
FIG. 1 is a process block diagram of a preferred embodiment of the process of the present invention.

The preferred embodiments of the present invention will be described in detail herein below with reference to the appended drawings and experimental examples.

Definitions

"Animal husbandry effluent slurry" generally refers to dejections including excrement such as feces and/or urine from animals being bred or raised in an agricultural setting. Animal husbandry effluent slurry may also be referred to as "manure" and may also include other dejections such as feed leftovers, bodily fluids and solids other than feces and urine such as hair, skin, mucous, etc. In one of the embodiments of the invention, the process is used to treat porcine manure including both urine and feces in slurry form.

"Mechanical separation" generally refers to the separation of solids from liquids that may be performed by filtration, centrifugation, and the like. The solids are generally not in suspension and thus may be separated mechanically.

"Newtonian fluid" generally refers to a fluid that flows like water. More particularly, a Newtonian fluid's stress vs. rate of strain curve is substantially linear and passes through the origin. In other words, the fluid's viscosity by definition depends only on temperature, pressure and the chemical composition of the fluid, which enables it to flow like water.

"Dilution" generally refers to adding solvent to solution to reduce the concentration of the solute(s). One or more solvent may be added to the solution. The dilution step b) in the process of the present invention is preferably performed using water since animal husbandry effluent slurries are aqueous solutions.

"Zeta potential" generally refers to the electrostatic potential generated by the accumulation of ions at the surface of a colloidal particle that is organized into an electrical double-layer, consisting of the Stern layer and the diffuse layer. An elevated zeta-potential indicates a stable colloidal fluid where the charged particles are well dispersed and are surrounded by significant ionic double-layers. A zeta potential of or near zero indicates an unstable colloidal fluid where the electrostatic double-layer of the charged particles has been greatly reduced, thereby removing the repulsive forces that keep such colloidal particles separate and allows for aggregation.

"Chelating agent", which may also be referred to as "chelant" or "chelator", generally refers to a ligand that binds through more than one coordination site to a polyvalent metal. Such ligands, which are usually organic molecules, therefore present multidentate binding.

In the context of the salts of alkaline earth metals used in step d) of the process of the present invention, "soluble" and "insoluble" generally refers to the salts' solubility within the liquid phase of step d). Solubility is dependant on temperature, solution concentrations, solvent, pH, miscibility and charge of the solution's components, among other factors. The solvent, in this case, is the Newtonian fluid coming from step c), to which a chelating agent may have been added. Thus, it may be appropriate to use a given salt depending on the properties of the solution to be treated. In a preferred embodiment where water is the principal solvent and the pH was brought to about 7, the preferred soluble salts may be $CaCl_2$, $CaBr_2$, $Ca(OH)_2$, $Ca(NO_3)_2$, $MgBr_2$, $MgCl_2$ and $Mg(NO_3)_2$ and the insoluble salts may be $CaCO_3$, $MgCO_3$, $Mg(OH)_2$ and MgO. For instance, $CaCl_2$ and $CaCO_3$ may be used respectively, in one of the preferred embodiments of treating hog manure slurry. In other embodiments where the presence of phosphates may be acceptable for the given animal husbandry effluent slurry, $Ca_3(PO_4)_2$ or $Mg_3(PO_4)_2$ may be used. Indeed, in most cases, Ca— and Mg-based salts may be used given their availability and suitability. Nevertheless, solubility charts or other references may be consulted to determine ideal salts to be used.

"Cationic coagulant" generally refers to a cationic compound that is large when compared with the soluble salts and enables the coagulation of suspended particles into larger clusters. For instance, polymers having low molecular weights between about 20,000 and about 200,000 may be used. The coagulant enables a removal of the electrostatic double-layer surrounding the charged colloidal particles, and a sequestration and agglomeration of such particles into small coagulated clusters.

"Flocculant" generally refers to a cationic compound that is large when compared with the coagulant. For instance, polymers having a high molecular weight of over 200,000 are preferably used. The large flocculant molecules enable a further agglomeration of the colloidal particles, many of which have been coagulated into clusters. The flocculant thus enables the last optional step in the progressive destabilization of the colloid and agglomeration of the colloid solid particles, binding coagulated clusters and remaining colloid particles together into larger agglomerates.

It should be noted that the terms "chelating agent", "salts", "coagulant" and "flocculant", though commonly used indiscriminately and interchangeably in some arts of solid-liquid separations, should be understood herein as being distinct. Some embodiments of the process of the present invention use these distinct chemicals in an ordered manner to efficiently destabilize the colloid mixture to effectively treat animal husbandry effluent slurries.

"Colloid" generally refers to a liquid-solid substantially homogeneous mixture, in which the colloidal solid particles are suspended and dispersed in the liquid phase. The dispersed medium may also include, besides the colloidal solid particles, gas-phase and liquid-phase droplets. However, in the context of the process of many of the embodiments of the present invention, the dispersed colloidal solid particles are targeted for separation from the liquid phase.

"Destabilized" generally refers to a colloid mixture that has been made to have a tendency to form clusters or agglomerates or flocs, due to the dispersed solid particles coming together due to interparticle forces and attractions, particularly van der Waals forces, as well as the forces between chelates, salts, coagulants and/or flocculants. In the process of the present invention, the destabilization is enabled by the reduction of the electrostatic double-layer by the progressive addition of chemical compounds, to effectively remove the repulsive forces that keep colloidal solid particles dispersed and separate.

"Electroflotation" generally refers to the creation of bubbles by electrodes immersed in the solution to enable solid particles to be collected by the bubbles and floated to the surface of the solution. In one embodiment of the present invention, the electrodes induce hydrolysis of water to produce $O_2$ and $H_2$ gas bubbles.

Embodiments of the Process

The embodiments of the process of the present invention employ a pre-treatment for preparing the liquid portion of an animal husbandry effluent slurry for being efficiently subjected to electroflotation.

FIG. 1 shows an embodiment of the process of the present invention in a process block diagram. The process of the present invention may be adapted to be batch, semi-batch or continuous depending on the volume and requirements of the given effluent slurry source.

In one embodiment, the animal husbandry effluent slurry to be treated is manure obtained from an animal farm 10 (feeder or breeder). The source manure 12 may be initially obtained from a hoggery. Hoggeries generate manure 12 which is collected and may be sent to a holding pit.

It should be noted that many porcine manure treatment processes obtain their source manure from a manure pit where the slurry has had a chance to decant. In one embodiment of the present invention, however, the manure 12 is collected from the pre-pit of a hoggery, to save time and space and to increase efficiency.

1) Pre-Treatment of the Effluent Slurry

Generally, a liquid portion of the manure is obtained for pre-treatment. In one embodiment of the present invention, step a) of the process includes filtering of the manure slurry. Still referring to FIG. 1, the manure slurry 12 is sent to a filter. The filter may include a mesh for removing the large rough solids 14 from the liquid phase 16. The rough solids 14 are removed and may be dried or composted for use as fertilizer or fuel. The liquid phase 16 is a colloidal mixture that is often malodorous and contains a high concentration of dispersed charged solid particles. It should be noted that the manure may be homogenized before being sent to be filtered.

Step b) of this embodiment of the process includes the dilution of the liquid phase 16. The liquid phase 16 is diluted with water as solvent 18 in an appropriate dilution vessel. This dilution produces a Newtonian fluid 22. The viscosity of the contents of the vessel may be measured using a viscosometer V to ensure that the fluid has reached the Newtonian zone. It should be noted here that the viscosity of the manure is a variable that one should consider during the manure's treatment. The viscosity affects the ability of the solid suspended particles, the chemical compounds of subsequent step d) as well as the coagulant and flocculant polymerizing agents of step e) to displace and collide. In addition, the viscosity influences the upward displacement of the micro-bubbles during the electroflotation step f).

Figure 3:
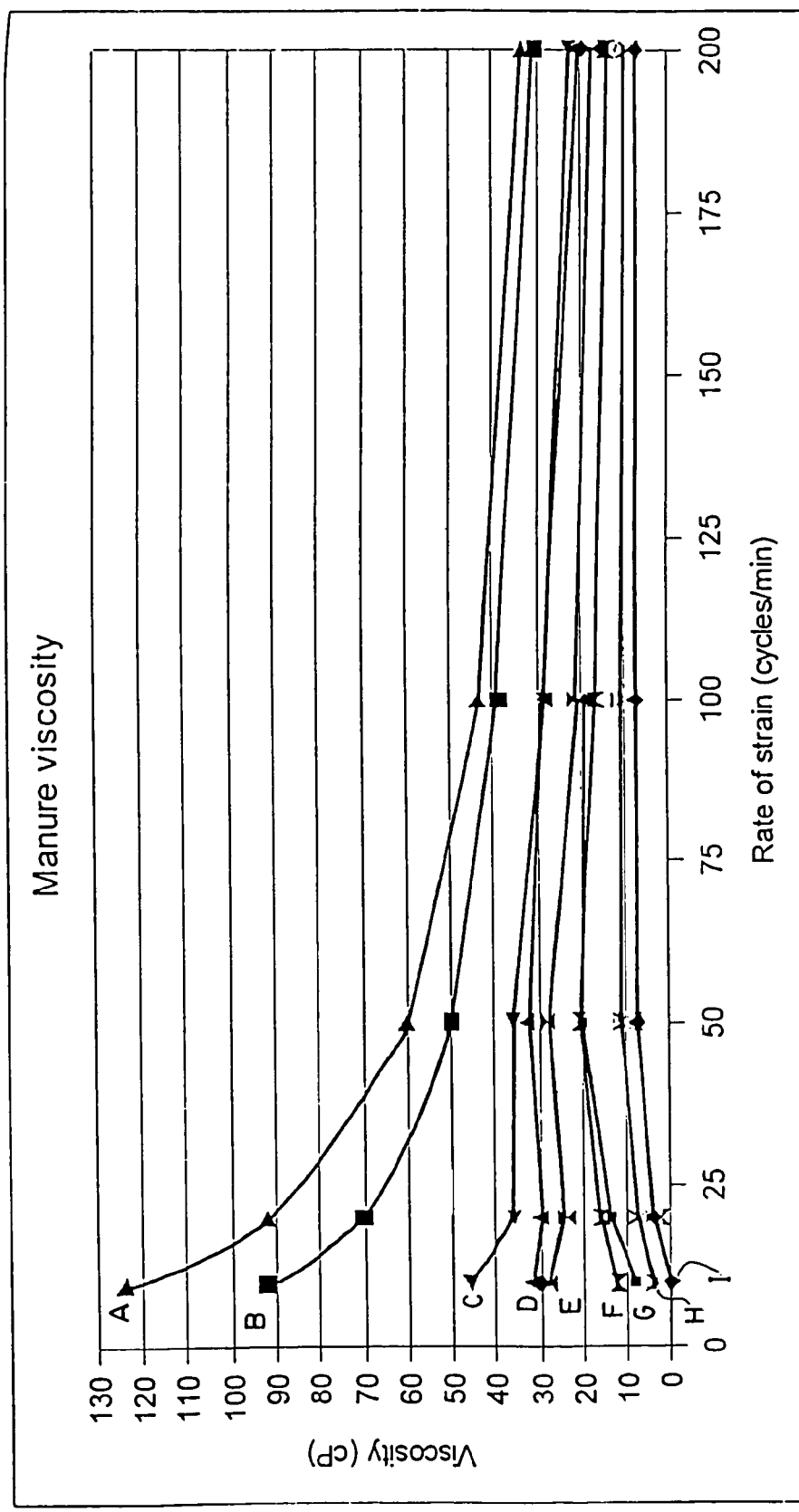
FIG. 3 is a graph of Viscosity vs. Rate of Strain for different types of manure at different dilutions.
Figure 4:
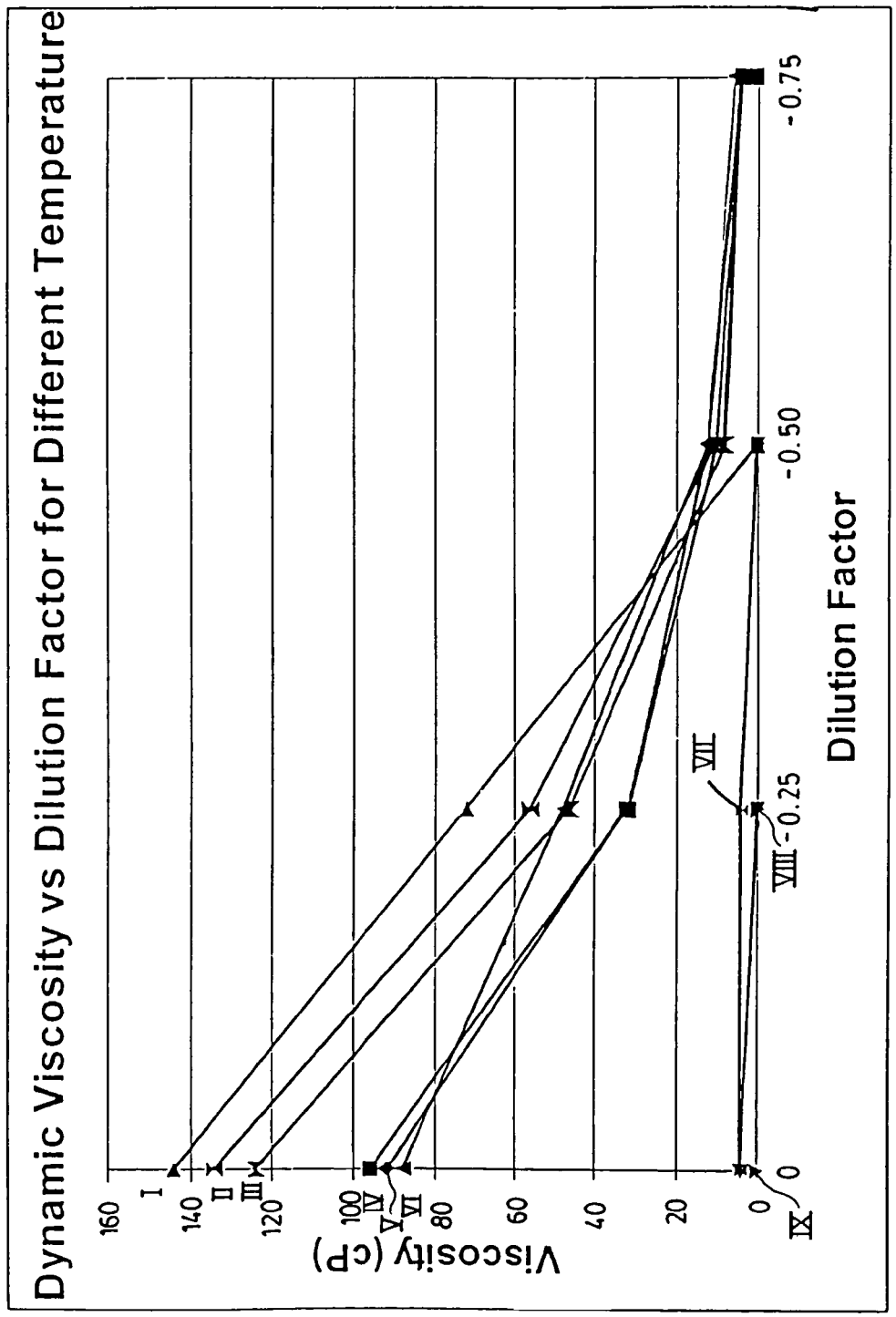
FIG. 4 is a graph of Viscosity vs. Dilution Factor for different types of manure at different temperatures.

Production of a Newtonian zone presents advantages such as further dispersing the suspended particles between the water molecules to modify the spatial distribution of the suspended particles, thus affecting the Stern and Helmholtz layers to facilitate and improve the subsequent chemical addition steps, such as steps c), d) and e). Step b) also enables a low viscosity to thereby improve the flowability of the liquid, thus enabling more rapid transport and easier mixing of the fluid. Step b) further aids in the generation of bubbles during the electroflotation step f), as the formation and ascension of the bubbles are facilitated. The bubbles are able to ascend in a dispersed and aleatory manner through the diluted and destabilized fluid. In addition, the Newtonian zone enables better predictability of the fluid dynamics of the liquid phase, thereby ameliorating the efficiency, scalability and quality of the process. FIGS. 3 and 4 show the relationship between viscosity and other variables and will be further discussed in the Examples provided hereinbelow.

Step c) of this embodiment of the process includes assuring the pH is under about 10. Optionally, this step includes the adjusting of the pH of the Newtonian fluid 22 with an organic acid 24 to under about 7.2. This step c) may be performed in another vessel, or alternatively in the same vessel as step b), depending on the setup of the installation and whether the process is batch or semi-batch. The pH is adjusted at this point in order to avoid excessive OH— ions which could disrupt the coagulated clusters that may be formed in later steps, which will be further discussed hereinbelow.

The organic acid 24 may be acetic acid. Alternatively, the organic acid may be citric acid or another suitable short carbon chain acid. In one embodiment, the neutralised liquid 26 with a pH of about 7 is produced. By avoiding conventional acids like HCl, a more efficient pre-treatment is enabled. Table 1 shows the improved effect of acetic acid in relation to HCl. However, many acids could be employed to obtain acceptable results. Tables 5a and 5b also show the effect of pH on the electroflotation.

The pH has an effect on the intensity of the surface charge of the adsorption complexes (organic micelles) and on the anions and cations distribution in the medium. Elevated concentrations of organic material in the liquid phase of the manure, for instance, affects the isoelectric point and the pH as well. For instance, in the case of manures coming from different sources, an increase in organic matter results in an increase in turbidity (R=0.97 for COD vs. FTU). One finds that the pH of the manure follows a similar trend, increasing with higher organic matter content. The following Table shows the pH, FTU and COD (carbon oxygen demand) of different manure sources.

| pH, FTU and COD of different manure sources | | | |
|---|---|---|---|
| Manure source | pH | FTU | COD (mg/L) |
| Maternity | 6.5 | 29 374 | 18 100 |
| Fattening with regular hydration | 6.7 | 42 220 | 102 000 |
| Fattening with low hydration | 7.3 | 63 503 | 158 000 |

The modification of the pH influences the direction of the adsorption of the available ions, the latter being retained at the surface of the absorption complexes by electrostatic forces. In some embodiments, the pH may already be in the working range.

There is also an optional step prior to step d) of determining the concentration of available cations in the pH adjusted liquid 26. It should be understood that in determining the concentration of available cations, the approximate concentration of at least one type of ion is determined. For some manures, the approximate concentration of the ion may be known beforehand, for instance if the manure to be treated has been studied and measured. Thus, it is not necessary in all cases for an actual measurement to be taken. In one embodiment of this step, ion-specific electrodes 27 are used to determine the concentrations of $H^+$, $Na^+$, $K^+$, $NH_4^+$ and $Ca^{2+}$. Measurements of such ions may be used to determine the amount of chemicals to add in the next steps. For instance, the $Na^+$ and $Ca^{2+}$ concentrations may be measured and used to determine the amount of $CaCl_2$ to add in step d), as will be explained.

A ligand such as EDTA may also be added in step d), to bond to trivalent cations like $Fe^{3+}$ in order to disperse the micelles. The amount of EDTA salt to add in the manure liquid is associated with the concentration of available $K^+$ present in the suspension. Optionally, an ion specific electrode may be used to measure the $K^+$ concentration. Furthermore, as the fine organic matter particles present in the manure (measured by the manure turbidity (FTU) and/or by the manure viscosity (cP)) increase, a similar trend occurs in the $K^+$ concentration and potentially in the trivalent metal content because both cations surround the organic micelles.

In fact, in manure effluent slurry, the available $K^+$ ions concentration is strongly correlated with the amount of organic matter particles in suspension (R=0.98 [$K^+$] vs. FTU; R=0.87 [$K^+$] vs. viscosity). Consequently, the concentration of available $K^+$ may provide an indication of the trivalent content of the suspension. Thus, an elevated concentration of $K^+$ indicates that a larger amount of chelating agent is desirable. Optionally, the chelating agent, such as EDTA, is added to be equal weight to $K^+$.

Prior to subsequent chemical treatment steps, the electronegative organic particles (also called "micelles") of the manure are surrounded by a dense zone of positive ions. The positive ions most frequently found are $H^+$, $Na^+$, $K^+$, $NH_4^+$, $Ca^{2+}$ and $Mg^{2+}$. The monovalent cations are known to be less efficient in the destabilization of a negatively charge colloid than divalent cations because in general they do not sufficiently reduce the surface potentiel of particles so as to allow the particles to become closer. In contrast, bivalent ions such as calcium and magnesium may promote agglomeration.

Because the attractive force between the cations and the negative surface of the micelles is a function of the thickness of the hydration layer that surrounds the micelles, it follows that different cations have different replacement powers with respect to each other. The replacement power decreases as follows: $Ca^{2+}>Mg^{2+}>K^+>H^+>Na^+$. In addition, this replacement tendency depends on the concentration of the given ion in the medium.

Referring to FIG. 1, the pH adjusted liquid 26 is an electronegative colloid. The electrocharged zones surrounding the colloidal suspended particles should be constricted to facilitate the destabilisation of the particles to improve the separation. It should also be mentioned that depending on the nature of the manure to be treated, different concentrations of available ions may be used to determine the proper addition of additives in subsequent step d).

Step d) of this embodiment of the process includes adding, optionally in sequential order, a chelating agent 28, a soluble salt of alkaline earth metal 30 and an insoluble basic salt 32 of the same alkaline earth metal. It should be noted that the salts 30,32 may be mixed and added together.

Any known chelating agent 28 may be useful, such as EDTA, which binds through more than one coordination site to polyvalent metals $Ca^{2+}$, $Mg^{2+}$, $Cu^{2+}$, $Mn^{2+}$, $Fe^{3+}$ and $Al^{3+}$, for instance. It thus, entraps both heavy metals and other di- or tri-valent metal ions. It confers an elevated electric field gradient favouring dissociation of the water molecules, which gives rise to protonisation of the medium and thus facilitates the action of the subsequent cationic agents. Also, in one embodiment, the chelating agent is added before the salts 30, 32. Calgon™ may also be used as a chelating agent.

The salts 30,32 are added in sufficient amount to balance the available cations and promote agglomeration of the suspended solid particles. To balance the available cations, an amount of soluble salt is added to have the same charge. To promote agglomeration, additional soluble salt is added, optionally so that the earth metal charge is at most double that of a monovalent available cation such as $Na^+$.

The addition of the soluble and insoluble salts 30,32 that are of the same family of alkaline earth metal, enables advantages such as surface charge equilibration to bring the suspended solids out of solution, promoting agglomeration, and also act as a local buffer during electroflotation. During the subsequent step f) of electroflotation, the insoluble salt 32 is able to dissolve at the conditions near the anode so that its cations may help precipitate some of the dissolved phosphates ($PO_4^{3-}$).

Optionally, the alkaline earth metal salt 30 and the basic salt 32 of step d) are respectively $CaCl_2$ and $CaCO_3$. The addition of the soluble salt such as $CaCl_2$, for instance, into the medium encourages the coming together of the micelles in order to result in coalescence. The micelles of the liquid colloid that were dispersed in the liquid phase due to the reciprocal actions of repulsion of the negatively charged particles are therefore partly coalesced. There may also be a destabilizing effect on the colloids that were heretofore stabilised by organic acids.

In one embodiment, when the concentrations of $Na^+$ and $Ca^{2+}$ are determined prior to step d), $CaCl_2$ is then added to obtain concentrations of these ions in the same proportion. For instance, if the liquid from step c) contains 600 ppm of available $Na^+$ and 0.4 ppm of $Ca^{2+}$, then one may add 300 ppm of $CaCl_2$ to bring the $Ca^{2+}$ to a balanced status in relation to $Na^+$, and then one may add 300 ppm more of $CaCl_2$ to further promote agglomeration. Optionally, the insoluble basic salt is added to the suspension in double the amount as the soluble salt.

The chelating agent 28 and salts 30 and 32 of step d) may be added to the liquid 26 in a single tank, if desired, and may also use the same vessel as previous steps. Step d) enables the progressive entrappement of polyvalent cations and reduction of the hydration layer surrounding the dispersed solid particles. A partly destabilized solution 34 is produced by this step.

Step e) of this embodiment of the process includes the addition of a cationic coagulant 36. Optionally, the cationic coagulant 36 and a cationic flocculant 38 are sequentially added, in a ratio of 5:1 to 30:1. The coagulant 36 is added first and sequesters and agglomerates the solid particles into clusters. The flocculant 38 is then added to form large flocks and further bring together the solid particles within the liquid colloidal mixture. This produces a destabilized colloidal mixture 40 with agglomerated flocs. This step may be performed in the same tank as previous steps d), c) and/or b). The zeta potential of the mixture is brought to about zero upon completion of step e). It can be measured using a device Z.

The coagulant may be a cationic polymer of relatively low molecular weight, optimally between about 50,000 and about 200,000. Optionally, the coagulant is BRENNTAG HCC-920™ or the like. Tables 4a and 4b show the effect of different quantities of coagulant on electroflotation.

The coagulation consists of the coming together of small particles into larger clusters which facilitates their displacement in the liquid phase to be treated by electroflotation. The coagulation occurs following destabilisation of the solid particles by the adsorption of coagulants. The coagulation of one embodiment of the present invention is performed above temperatures of 5° C. At low temperatures, the decrease in coagulation efficiency may be attributed to changes in the structure of the small aggregates, a decrease in the rate of hydrolysis and precipitation and/or an increase in the liquid's viscosity and its effect on sedimentation.

Optionally, the flocculant 38 is a cationic polymer of high molecular weight, optionally between 200,000 and millions. Optionally, the flocculant is a polyacrylamide-based polymer.

Optionally, the steps a) to e) of the process are performed at a temperature of at least about 15° C.

In order to have a better appreciation of the above-described chemical additions of steps d) and e), it is worthwhile to discuss some of the electrochemistry of the colloidal liquid in relation to the final step of electroflotation.

Electronegative colloid micelles have a tendency to migrate toward the anode during electroflotation. To limit this situation, the zone surrounding the micelles may have its potential diminished. By bringing the zeta potential to zero, the electrocharged zone surrounding the particles is constricted, which facilitates the coalescence of the particles as well as the coagulation of the particles around a coagulant. Enough coagulant should be added to overcome the resulting energy barrier of the contracted diffuse zone. Other variables to consider are the following: concentration of the solid particles in the liquid, carbon oxygen demand (COD), nature and quantity of the ions, preparation of the mixture, and the temperature of the solution.

After coagulation and flocculation of step e), a destabilized pre-treated mixture 40 is produced and sent for electroflotation. Optionally, before electroflotation there is a step of lefting the pre-treated mixture rest at a constant temperature to improve the electroflotation. Also optionally, such a temperature is between about 25° C. and about 30° C. and the resting is performed for at least about 20 minutes.

2) Electroflotation

Step f) of this embodiment of the process includes the electroflotation of the destabilized mixture 40.

Referring now to FIG. 2, the electroflotation step f) optionally takes place in a separate electroflotation cell 42, including an anode 44 and a cathode 46 at which electrolysis occurs to produce bubbles. A more detailed description of the electroflotation cell 42 of one embodiment will be given hereinbelow.

Referring back to FIG. 1, the bubbles collect the flocculated solid particles (also called "floc") and bring them to the surface of the cell, to be removed. The electroflotation step g) thus produces treated liquid 48 and floated solids 50. This step also produces sediment 52 at the bottom of the electroflotation cell. The treated liquid may be used for several applications like irrigation of crops or as liquid fertilizer for crops. Tables 2 and 3 show the time frame involved in preferred embodiments of the electroflotation step.

In one embodiment of the process of the present invention, the steps are sequential so that the suspended particles are isolated, sequestered, agglomerated and then floated in an efficient manner. An understanding of the surface and charge characteristics of manure and of the liquid phase has enabled this efficient separation process. Rather than haphazardly adding separation chemicals, the process employs a sequence of steps.

Also, in one embodiment of the process, the use of heavy metal ions for agglomeration may be avoided. Thus, alum and $Fe^{3+}$ may be avoided in the pre-treatment. In addition, electrocoagulation using consumable electrodes such as iron electrodes may also be avoided. This enables a reduction in potentially polluting compounds that could remain in the solution and cause damage to irrigated land, water systems, or in the solid fertilizer or fuel products.

In order to have a greater appreciation of the electroflotation according to an embodiment of the present invention, it is useful to further describe the chemistry of the system.

In an aqueous medium, an electric potential enables the electrolysis of water and the generation of gaseous microbubbles of hydrogen and oxygen. The hydrogen and oxygen created at the electrodes travel upward toward the surface of the liquid in the form of bubbles with which solid particles become connected and are guided upward. These solid particles form froth at the surface of the liquid, often called "floc", which is supported underneath by the ascending bubbles. Under the floc, the liquid comes to appear substantially transparent. Very often, more than 90% of the bubble-floc interaction occurs in the first few minutes of the electroflotation.

The principle chemical reactions occurring at the surface of the electrodes to generate the bubbles are the following:

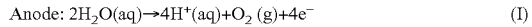

Anode: $2H_2O(aq) \rightarrow 4H^+(aq) + O_2(g) + 4e^-$ (I)

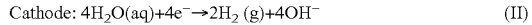

Cathode: $4H_2O(aq) + 4e^- \rightarrow 2H_2(g) + 4OH^-$ (II)

Two molecules of hydrogen gas are generated at the cathode and one molecule of oxygen gas is generated at the anode.

If the aqueous medium contains $Cl^-(aq)$, another reaction may occur at the anode:

Anode: $6Cl^- \rightarrow 3Cl_2(g) + 6e^-$ (III)

The chlorine gas may dissolve in the electrolyte where it undergoes hydrolytic dissimulation into hypochloric acid (HClO) and chlorine. In certain conditions the hypochloric acid transforms into a hypochlorite salt of sodium or potassium. In such conditions, the hypochlorite salt will have a bacteriocidic effect.

Parameters Influencing Electroflotation

A variety of factors may influence the size of the bubbles generated by the electroflotation, including the current density, temperature, roughness of the surface of the electrode, the material of the electrode and the pH of the medium. The efficiency of the electroflotation process also depends on the following parameters of the cathode: the diameter of the cathodic filaments, the shape and surface areas of the cathode and the roughness of its surface.

The movement of the bubbles within the electroflotation cell influences the flotation process. The trajectory of the bubbles is affected by the hydrodynamics of the system and the position of the electrodes within the cell, the viscosity of the fluid to be treated and the temperature of the solution. The success of the flotation depends on generating the sufficient volume of bubbles for the solid particles in suspension. However, a too high number of bubbles can cause their coalescence or aggregation rather than attachment to the particles.

Electrode Considerations

In one embodiment, the electrodes should be able to produce the gaseous bubbles $H_2$ and $O_2$. In addition, the electrodes preferably have a long life span to minimize the cost of replacing them. Factors that are linked to the life span of electrodes will be discussed hereinbelow.

The intensity of electrolysis is affected by the electric energy:

$$E_{elec} = W^*t \qquad (IV)$$

W=electric power
T=processing time

When attempting to have a rapid process, increasing the power may reduce the effective processing time. The electric power is modified by increasing the voltage (V) or the current (I).

These two factors may also cause a considerable increase in the erosion and damage to the electrodes. It is desirable in this process to minimize the processing time and at the same time consider the integrity of the electrodes. The reactions occurring at the anode (depletion of electrons) and at the cathode (source of electrons) are particular to the functioning of the electrodes. The metal used for the anode is different from the metal of the cathode.

One of the objectives sought in the conception of the electrodes was to obtain a large surface area of exchange in a small volume.

Voltage Considerations

The voltage at the extremities of the electrolysis cell is in fact the sum of three factors:

the theoretical reversible voltage of the redox reaction: corresponding to the bond energy of the elements to be decomposed; this potential is an absolute threshold under which nothing can occur, such as the electrochemical dissociation of:

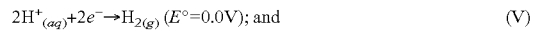

$$2H^+_{(aq)} + 2e^- \rightarrow H_{2(g)} \; (E°=0.0V); \text{ and} \qquad (V)$$

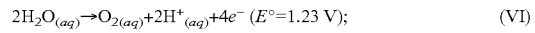

$$2H_2O_{(aq)} \rightarrow O_{2(aq)} + 2H^+_{(aq)} + 4e^- \; (E°=1.23 \text{ V}); \qquad (VI)$$

the decrease in resistance (ohms) in the electrolyte directly linked to its conductivity: this decrease can be diminished by bringing the electrodes closer together (Joule effect);

the activation overvoltage, which shows the kinetic limitations of a reaction at an electrode: it represents the work necessary to extract the electrons from the surface of the electrodes; for a given electrolyte, the activation overvoltage depends on the nature of the electrode and its surface properties.

The last factor is an important one in appreciating the performance of an electrode. The efficiency of an electrolytic process depends on this factor. It is a starting point for much research activity in the field of making economic and well-performing electrodes.

Example Embodiment of the Electroflotation Cell 42

Figure 2A:
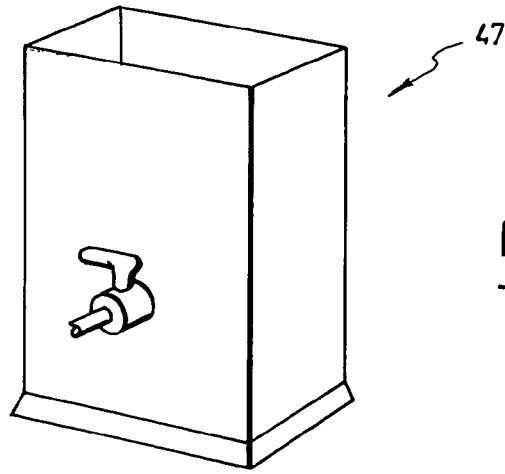
FIGS. 2a-2c are perspective views of a preferred embodiment of an electroflotation cell and components thereof.
Figure 2B:
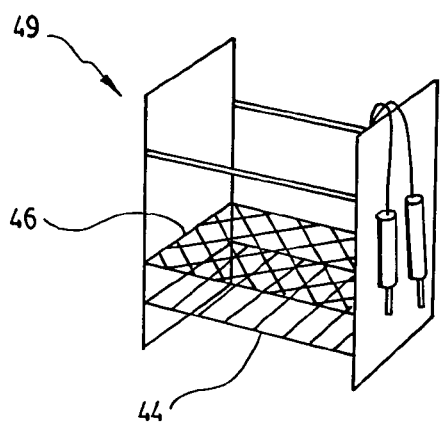
Figure 2C:
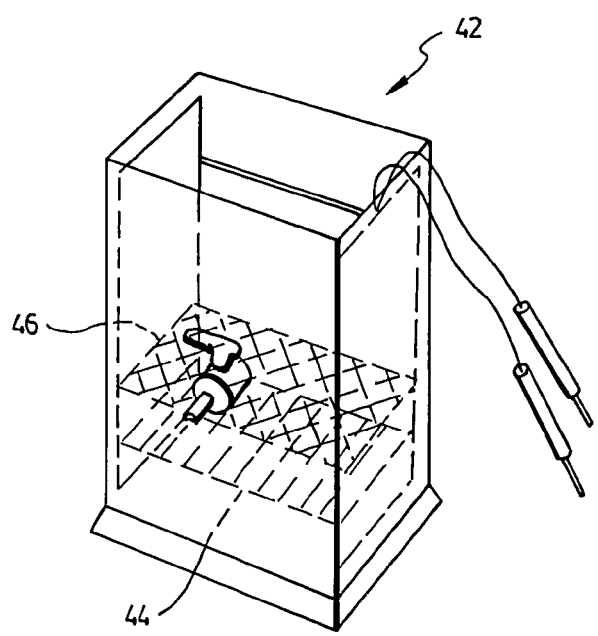

The pilot experiments led to the development of one embodiment of the electroflotation cell 42 shown in FIGS. 2a-2c.

The electroflotation cell 42 has a capacity to produce micro-bubbles of $H_2$ at a high density. The anode 44 and cathode 46 are located at the bottom of the cell 42, the anode 44 being the lower of the two. This enables excellent convective movement of the bubbles within the cell and favors the formation and ascension of hydrogen bubbles. This configuration also enables the electrodes to be in good contact with the fluid solution. If a solid that is denser than the liquid is formed, it will be able to be deposited at the bottom of the cell. The space between the cathode 46 and the anode 44 was optionally 9 mm in the pilot cell to enable good bubble generation and ascension. Also optionally, the anode 44 and cathode 46 have a surface covering about the entire transverse section of the cell 42. The shape of the cell 42 (optionally cylindrical) and orientation of the electrodes reduce dead zones, which aids in the electroflotation.

In this pilot embodiment, an outer vessel 47 was provided for holding the solution and an electroflotation sub-assembly 49 was inserted in the vessel 47.

The cathode 46 may be made of stainless steel and may take the form of a mesh with steel filaments of about 1 mm in diameter, which are arranged tightly together, optionally with spaces of about 3 mm, in order to offer an intense production of micro-bubbles of $H_2$ capable of bringing the solid particles of the colloid manure mixture to the surface of the liquid. The chemical resistance of the cathode is in conformity with norms of industry. One limitation is the electroplating of the cationic soluble metals, which are either in the solution to start out with or come from anode electro-stripping due to the influence of the overvoltage between the electrodes ($M \rightarrow M^{n+} + ne^-$). The cationic species within the manure or electro-stripped from the anode are, in both cases, attracted to the cathode.

At the cathode, two chemical phenomena should be noted: the adsorption of $H_2$ that produces the release of molecular hydrogen in gaseous form and the formation of $OH^-$ released by the electrolysis of water. During the progression of the process, the hydrogen may damage the material of the cathode due to the adsorption of hydrogen at the cathode (known as hydrogen inducted damages), internal corrosion related to the high chemical reduction conditions. Certain mechanisms change the nature of the medium: microscopic fissures developed in the material can have long term influence; hydrogen can penetrate and form blisters inducing corrosion by cracking.

In the example embodiments, three types of anodes were employed: stainless steel, tin and titanium.

Titanium may be used, optionally with a current density of about 28 $mA/cm^2$. This current level was determined in order to enable a short electroflotation time without significantly damaging the electrodes.

With a stainless steel anode, the tests were conducted at a variety of current densities, approximately 22, 44 and 66 $mA/cm^2$, with an anode surface area of about 150 $cm^2$. Current densities of 40 $mA/cm^2$ or above provoked some degradation of the anode.

It may also be possible to plate or coat two above anodes with a conductive composite (such as $RuO_2$, or $IrO_2$ or Ta) to increase the life-time of the anode.

Various embodiments of the electroflotation step g) of the present invention may enable a variety of advantages over others floatation techniques. Some of these advantages are the following:

Very small and dispersed bubbles with an average diameter of 20 μm. This increases the contact surface between the particles in suspension and the bubbles. In addition, the bubbles may be substantially uniform in size.

By varying the current density it may be possible to create many different concentrations of bubbles in the flotation medium, thereby increasing the probability of collisions between the bubbles and the particles.

The choice of solution conditions and appropriate electrode surface conditions enable obtaining the optimal separation results.

Other advantages of the electroflotation embodiment of the present invention include the competitive operating cost, the ability to adapt to a variety of volumes, a low residence time, simple installation, little incumberment, adaptability to enable a high degree of automation, a high elimination rate of BOD (biochemical oxygen demand) due to the oxidation of organic molecules at the anode and elimination of greases and oils. In addition, the assent of the flocs to the surface may result in a froth containing from 9 to 12 wt % solids.

Experimentation, Results, and Examples

The present invention will be more readily understood by referring to the following examples. These examples are illustrative of the wide range of applicability of the present invention and are not intended to limit its scope. Modifications and variations can be made therein without departing from what has actually been invented. Although any method and material similar or equivalent to those described herein can be used in the practice for testing of the present invention, some preferred methods and materials are described.

The Animal Husbandry Effluent Slurries

The animal husbandry effluent slurries used in the experiments were hog manures and bovine manure. Different sources and types of manure were used to show the wide applicability of the embodiments of the process of the present invention.

Experimental Procedures

The hog manures were taken from the hoggeries' pre-pit and subjected to embodiments of the process of the present invention.

In preliminary testing, manures were subjected to electroflotation without a pre-treatment. It was concluded from these tests, which resulted in poor separation and a high amount of dirty emulsion, that pre-treatment of the manure may be desirable.

EXAMPLE 1

The manure was first of all filtered through a square mesh with 2 mm openings to remove the coarse solids. The viscosity was then brought to the Newtonian zone. Then, the experiments were performed with a volume of 600 ml of 50% manure having the following characteristics: pH 7.8, $Na^+$: 265 ppm, $K^+$: 700 ppm, $Ca^{2+}$: n.d. The pH was adjusted from 7.8 to 7.0. The pH adjustment was performed using hydrochloric acid HCl (for experiments B1-B3) and with commercial acetic acid (for experiments B4-B6). After that, 700ppm of EDTA or Calgon™ (sodium metaphosphate), were added followed by a solution of 300 ppm $CaCl_2$ and 600 ppm of $CaCO_3$. Following that, a cationic coagulant HCC-920™ was added to the solution (9 ml/L). Finally, a cationic flocculating agent HCC-198™ was added (3 ml/L). The solution was mixed for about 20 minutes and then left to sit for about 20 minutes, before the electroflotation treatment step. The electrode sub-assembly was then placed in the solution of the beaker. The stainless steel grill of the cathode was made of square mesh of 3 mm and was at a 9 mm distance from the anode. The anode was made of titanium rods of 6 mm diameter Tables 1a and 1b show the effect of the different acids used to adjust the pH on these embodiments of the process. In addition, different chelating agents were also tried to evaluate their impact on the liquid fraction treated by electroflotation.

TABLE 1a

Before electroflotation
Effect of pH adjustment acid

| Empty Weight | Weight V = susp. | Final Vol. | Temp. | pH Cond. | Floc Height | Clear Zone |
|---|---|---|---|---|---|---|
| B1 557.71 7.0 (HCl + ED) | 1238.04 | | | 7.0 | 2.3/6.6 cm | 0.8/5.8 cm |
| B2 556.26 7.0 (HCl + CA) | 1200.46 | | | 7.0 | 1.8/6.0 cm | 0.7/5.3 cm |
| B3 557.45 6.9 (HCl + ED) | 1246.46 | | | 7.0 | 3.4/7.7 cm | 0.7/5.8 cm |
| B4 557.02 7.0 (AA + ED) | 1267.71 | | | 7.0 | 2.4/6.8 cm | 0.5/5.7 cm |
| B5 557.19 7.0 (AA + CA) | 1274.86 | | | 7.0 | 2.5/7.0 cm | 1.5/5.7 cm |
| B6 564.69 7.0 (AA + ED) | 1264.53 | | | 7.0 | 1.7/6.4 cm | 2.5/5.7 cm |

TABLE 1b

After electroflotation

| Liquid (g) | Floc (g) | Sediment (g) | Final pH | Cond. | Turb. | Total (g) |
|---|---|---|---|---|---|---|
| B1 442.70 7.0 (HCl + ED) | 43.12 | 156.46 | 7.8 | 28.52 | 306 | 642.28 |
| B2 390.82 7.0 (HCl + CA) | 36.48 | 168.09 | 8.0 | 28.74 | 337 | 595.39 |
| B3 320.51 6.9 (HCl + ED) | 47.79 | 281.20 | 7.9 | 28.09 | 314 | 649.50 |
| B4 355.76 7.0 (AA + ED) | 38.99 | 275.14 | 8.0 | 23.45 | 104 | 669.89 |
| B5 402.81 7.0 (AA + CA) | 47.45 | 229.91 | 7.9 | 23.13 | 191 | 680.17 |
| B6 344.00 7.0 (AA + ED) | 36.58 | 277.54 | 7.9 | 24.52 | 137 | 658.12 |

Table 1a shows the different treatment conditions and the pH before performing the electroflotation. The effects of HCl versus acetic acid were compared. The effects of different chelating agents were also compared. The results in Table 1b show that the use of acetic acid rather than HCl contributed to the further decrease of the turbidity of the liquid solution treated by electroflotation, and that the chelating agents had similar effects on the turbidity after electroflotation.

The results also show that the quantity of sediments is about 20% greater with treatments using acetic acid compared to HCl, which indicates that the weak acetic acid favours the formation and the precipitation of insoluble compounds enabling a clearer treated solution.

EXAMPLE 2

The manure was first of all filtered through a square 2 mm mesh. The viscosity was brought to the Newtonian zone. This experiment was performed in a volume of 600 ml of 50% manure having the following characteristics: pH: 8.5, available $K^+$: 856 ppm, $Na^+$: 363 ppm, $Ca^{2+}$: 0.48 ppm in the suspension. The pH was adjusted from 8.5 to 7.0 using commercial acetic acid. After that, 900 ppm of EDTA were added. Then, a solution of 400 ppm of $CaCl_2$ and 800 ppm of $CaCO_3$ were added. After that, a cationic coagulant HCC-920™ (9 ml/L) was added to the solution. Finally, a flocculent HCC-198™ (3 ml/L) was added to the solution. The solution was mixed for about 20 minutes and then let to sit for about 20 minutes. The electrode sub-assembly was then immersed in the solution of the beaker. The cathode was made of stainless steel having filaments that were made of square mesh of 3 mm, the anode was made of titanium rods having a 6 mm diameter. The cathode and anode were spaced apart from each other by about 9 mm.

TABLE 2

| Time | Amps | Volts | Floc |
|---|---|---|---|
| 0 | 3.64 | 30.5 | 0 |
| 2 | 3.65 | 25.9 | 3.0 cm |
| 3 | 3.65 | 25.4 | 4.5 cm |
| 4 | 3.66 | 25.4 | 6.3 cm |
| 4:08 | | | (Clarification) |
| 7:11 | 3.68 | 25.5 | 7.4 cm |
| 7:45 | 3.68 | 25.5 | |

Table 2 shows the benefit of adding EDTA in a similar proportion to the non-bound $K^+$ in addition to the others additives. This additive enables an good performance by electroflotation as shown by the rapid clarification of the liquid solution. A very desirable result was obtained in 4.08 minutes with added EDTA.

EXAMPLE 3

The manure was first of all filtered through a square 2 mm mesh. The viscosity was brought to the Newtonian zone. This experiment was performed in a volume of 600 ml of 50% manure having the following characteristics: pH: 8.5, $K^+$: 856 ppm, $Na^+$: 363 ppm, $Ca^{2+}$: 0.48 ppm. In the suspension the pH was adjusted from 8.5 to 7.0 using commercial acetic acid. After that, 900 ppm of EDTA were added. Then, a 400 ppm $CaCl_2$ and 800 ppm $CaCO_3$ were added. In addition, a cationic coagulant HCC-920™ (9 ml/L) was added to the solution. Finally, a flocculent HCC-198™ (3 ml/L) was added to the solution. The solution was mixed for about 20 minutes and then let to sit for about 20 minutes. The electrode sub-assembly was then immersed in the solution of the beaker. The cathode was made of stainless steel of square mesh of 3 mm. The anode was made of titanium rods having a 6 mm diameter. The cathode and anode were spaced apart from each other by about 9 mm.

TABLE 3

| Time | Amps | Volts | Floc |
|---|---|---|---|
| 0 | 3.63 | 31.0 | 0 |
| 1 | 3.65 | 27.0 | |
| 2 | 3.65 | 25.6 | 2.5 cm |
| 3 | 3.65 | 25.0 | 4.5 cm |
| 4 | 3.65 | 25.0 | 5.8 cm |
| 4.55 | | | Clarification |
| 5 | 3.66 | 25.0 | 7.4 cm |
| 6:23 | | | Almost complete |
| 7 | 3.66 | 25.2 | 7.8 cm |
| 7:35 | | | Complete |

Table 3 is another example of the same procedure of pre-treatment as Example 2 involving the same liquid manure and shows similar results regarding the benefit of adding EDTA. Furthermore, Tables 2 and 3 show the consistency between trials as far as the clarifying time is concerned.

EXAMPLE 4

This experiment was to evaluate the effects of varying the concentration of the cationic coagulant (HCC-920™) on the separation performance by electroflotation. The manure was first filtered through a 2 mm mesh. The viscosity was then brought to the Newtonian zone. These experiments occurred in a volume of 600 ml of 50% manure having the following characteristics: pH: 8.5, $K^+$: 856 ppm, $Na^+$: 363 ppm, $Ca^{2+}$: 0.48 ppm. The pH was adjusted from 8.5 to 7.0 with commercial acetic acid.

Then, 900 ppm of EDTA were added, followed by a 400 ppm solution of $CaCl_2$ and a 800 ppm $CaCO_3$ solution. A cationic coagulant HCC-920™ was then added (0, 3, 6, 9 and 12 ml/L). Finally a cationic flocculant HCC-198™ was added to the solution (3 ml/L). The solution was mixed for 20 minutes and then left to sit for 20 minutes before electroflotation. The electrode sub-assembly was inserted into the solution of the beaker. The cathode was made of stainless steel having filaments that were made of square mesh of 3 mm. The anode was made of titanium rods having a 6 mm diameter. The cathode and anode were spaced apart from each other by about 9 mm.

The temperature of the manure before electroflotation was 23.5° C. The initial turbidity of the manure was 20,467 FTU.

TABLE 4a

| | | | Before electroflotation | | | | |
|---|---|---|---|---|---|---|---|
| Empty Weight | Weight V = susp. | Final Vol. | Temp. | pH | Cond. | Floc Height | Clear Zone |
| B1 557.78 0 ml/L | 1263.95 | 675 ml | | 7.6 | 20.37 | | 0.0/5.4 cm |
| B2 556.31 3 ml/L | 1227.88 | 760 ml | | 7.6 | 19.88 | | 1.3/5.5 cm |
| B3 557.58 6 ml/L | 1293.66 | 750 ml | | 7.5 | 19.88 | | 1.8/5.8 cm |
| B4 557.11 9 ml/L | 1281.80 | 700 ml | | 7.5 | 20.53 | | 0.9/5.8 cm |
| B5 557.45 12 ml/L | 1289.97 | 700 ml | | 7.4 | 19.78 | | 0.7/6.0 cm |

TABLE 4b

| | | After electroflotation | | | | |
|---|---|---|---|---|---|---|
| Liquid | Floc | Sediment | pH | Cond. | Turb. | Total |
| B1 459.66 0 ml/L | 36.93 | 155.21 | 8.5 | 23.01 | 3447 | 651.80 |
| B2 406.61 3 ml/L | 52.37 | 155.98 | 8.2 | 22.23 | 207 | 614.96 |
| B3 412.25 6 ml/L | 58.36 | 209.88 | 8.0 | 21.84 | 247 | 680.49 |
| B4 434.42 9 ml/L | 57.00 | 185.39 | 7.8 | 22.46 | 121 | 676.81 |
| B5 425.02 12 ml/L | 55.92 | 198.04 | 7.8 | 23.13 | 129 | 678.98 |

The results are conclusive on the benefit of a cationic coagulant in obtaining a good solid-liquid separation of the manure, as shown by the turbidity value of 3447 FTU for the process using no cationic coagulant in its pre-treatment. In addition, the clarification of the manure was especially good at the two highest concentrations of the cationic coagulant, 9 ml/L and 12 ml/L. The turbidity values at these two conditions were respectively 121 and 129 FTU.

EXAMPLE 5

This experiment was to evaluate the pH variation of the hog slurry with respect to the separation performance by electroflotation. The manure was first filtered through a 2 mm mesh. The viscosity was then brought to the Newtonian zone. This experiment was performed in a volume of 600 ml of 50% manure having the following characteristics: pH: 8.5, $K^+$: 856 ppm, $Na^+$: 363 ppm, $Ca^{2+}$: 0.48 ppm in the suspension. From the initial pH of 8.5, commercial acetic acid was added to obtain a manure pH of 6.5, 7.0, 7.5 8.0, 8.5. Then, a 900 ppm amount of EDTA was added, followed by a 400 ppm solution of $CaCl_2$ and a 800 ppm $CaCO_3$ solution. A cationic coagulant HCC-920™ was then added (9 ml/L). Finally, a cationic flocculant HCC-198™ was added to the solution (3 ml/L). The solution was mixed for 20 minutes and then left to settle for 20 minutes before electroflotation. The electrode sub-assembly was inserted into the solution of the beaker. The cathode was made of stainless steel having filaments that were made of square mesh of 3 mm. The anode was made of titanium rods having a 6 mm diameter. The cathode and anode were spaced apart from each other by about 9 mm. The turbidity value of the manure was 20,467 FTU.

TABLE 5a

| | | Before electroflotation | | | | | |
|---|---|---|---|---|---|---|---|
| Empty Weight | Weight V = susp. | Final Vol. | Temp. | pH | Cond. | Floc Height | Clear Zone |
| B1 557.78 8.5 (0 ml AA) | 1239.55 | 675 ml | 23.5 | 8.3 | 16.47 | 1.6/5.9 cm | 1.4/5.2 cm |

TABLE 5a-continued

| | | Before electroflotation | | | | | |
|---|---|---|---|---|---|---|---|
| Empty Weight | Weight V = susp. | Final Vol. | Temp. | pH | Cond. | Floc Height | Clear Zone |
| B2 556.22 6.5 (138 ml AA) | 1328.43 | 760 ml | | 7.1 | 16.83 | 1.9/7.0 cm | 1.8/5.9 cm |
| B3 557.75 7.0 (46 ml AA) | 1294.74 | 750 ml | | 7.5 | 16.47 | 2.0/6.3 cm | 1.5/5.6 cm |
| B4 557.08 7.5 (28 ml AA) | 1277.82 | 700 ml | | 7.6 | 16.88 | 1.7/6.2 cm | 1.3/5.6 cm |
| B5 557.36 8.0 (14 ml AA) | 1267.15 | 700 ml | | 8.1 | 16.79 | 1.6/6.0 cm | 1.4/5.6 cm |

TABLE 5b

| | | After electroflotation | | | | |
|---|---|---|---|---|---|---|
| Liquid | Floc | Sediment | pH | Cond. | Turb. | Total |
| B1 321.32 8.5 | 47.52 | 258.11 | 8.5 | 22.55 | 210 | 626.95 |
| B2 405.49 6.5 | 39.32 | 272.15 | 7.6 | 20.55 | 79 | 716.96 |
| B3 352.44 7.0 | 56.40 | 284.79 | 7.9 | 21.93 | 100 | 693.63 |
| B4 369.43 7.5 | 35.54 | 253.80 | 8.0 | 21.36 | 119 | 658.77 |
| B5 372.12 8.0 | 51.36 | 238.92 | 8.2 | 21.38 | 158 | 662.40 |

The results show that a low pH allows the liquid manure to be better clarified than at high pH, such as about 8.5. In addition, from the lowest pH (6.5) to the highest (8.5) the turbidity value increases.

EXAMPLE 6

In this example, two different manures were treated. The first manure was from a maternity hoggery from the Assomption region of Quebec, Canada, and the second was a feeder manure bio-fermented from Eastern Townships of Quebec, Canada, which was diluted with 50% tap water. The experiment showed the applicability of an embodiment of the process to a variety of different manures. The turbidity measurements of the liquid after electroflotation of the maternity manure were between 22 and 27 FTU.

Other Experimental Results

Figure 6A:
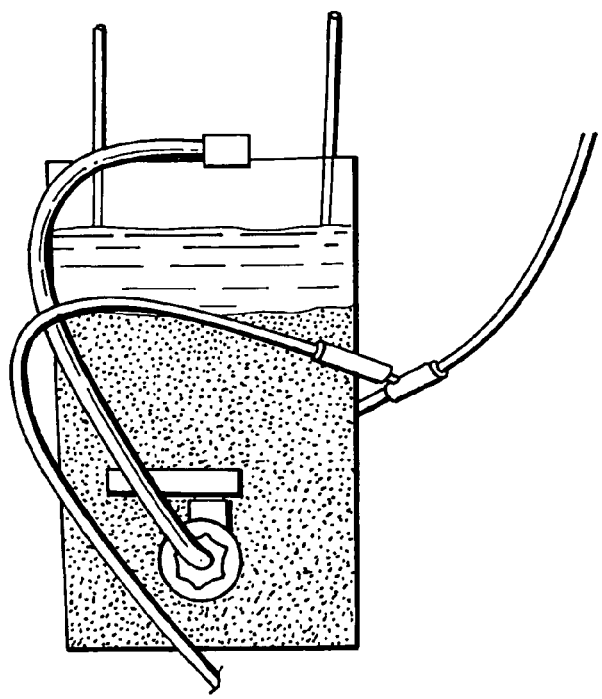
FIGS. 6a and 6b are respectively before and after perspective views of the electroflotation step of a preferred embodiment of the present invention.
Figure 6B:
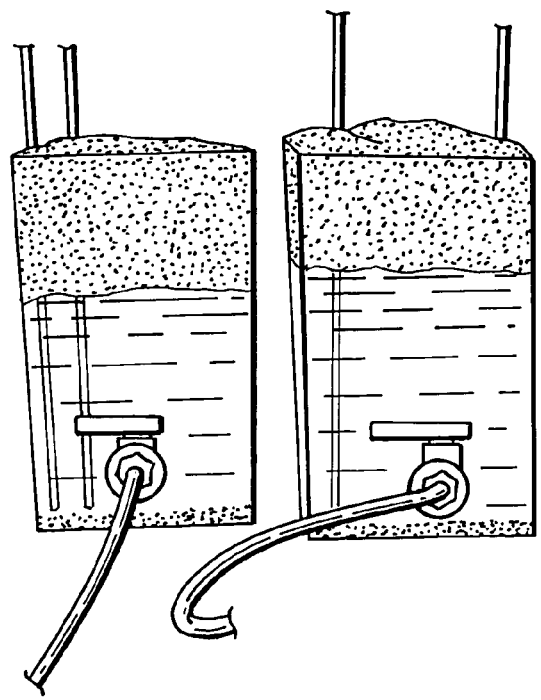

Once the separation of the solid fraction from the liquid is complete, the turbidity of the manure after electroflotation may be reduced by 99.9%. For example, for feeder manure that was initially bio-treated, the turbidity was reduced from 20,467 FTU to 79 FTU after the electroflotation treatment process. Referring to FIGS. 6a-6c, the effect of the electroflotation may be seen for amounts of 220 ml (FIG. 6a) and 2 L. (FIGS. 6b and 6c) shows that this treatment is also reproducible.

One may also conclude that the COD of the liquid was also greatly reduced because of the strong correlation between FTU and COD (R=0.97 linear model).

The concentration of phosphorus found in the liquid fraction of the manure treated by electroflotation may be greatly reduced up to about 99%. For instance, the phosphorus concentration went from 1579 mg/L in a raw bio-treated manure to 21 mg/L in the treated liquid.

Figure 5A:
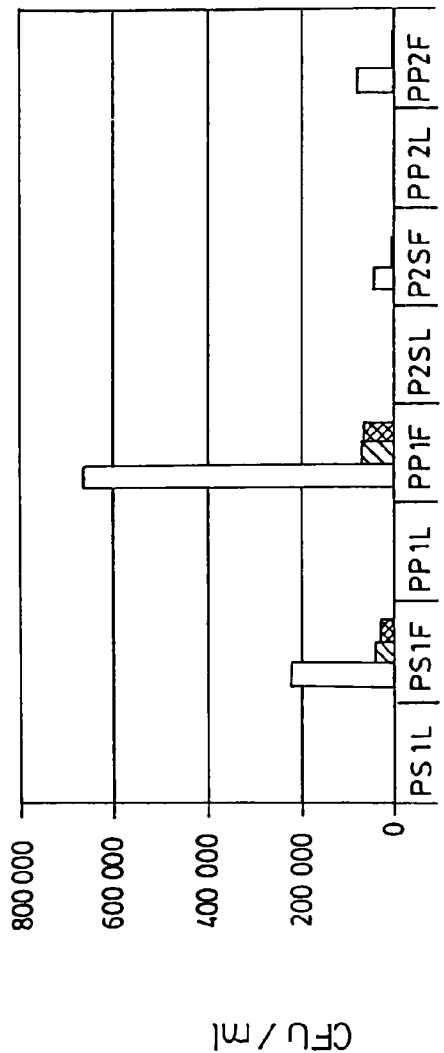
Figure 5B:
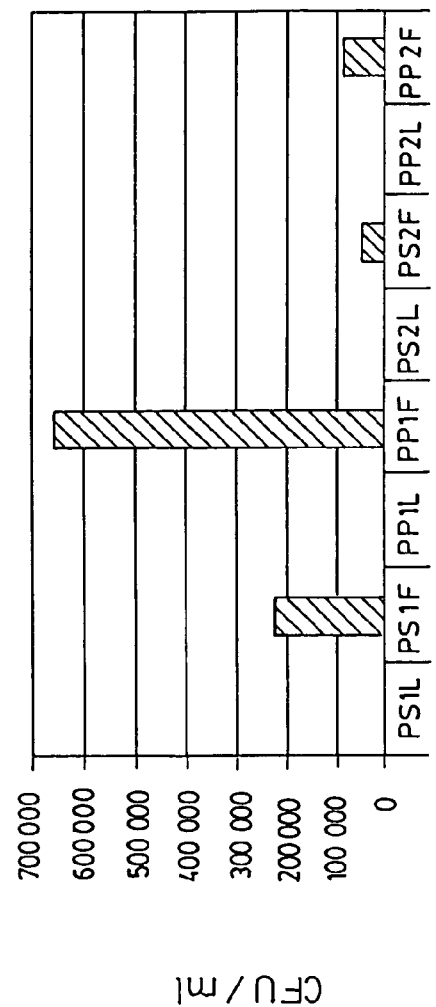

Referring to FIGS. 5a-5c, the preliminary studies on pathogen content in the manure treated by electroflotation shows that the liquid fraction is disinfected (L=liquid; F=floc). There is no trace of pathogens in the liquid fraction as they are rather found in the solid fraction and more particularly in the separated floc for the types of raw manure under study The qualitative study of the odours of the manure treated by pre-treatment and electroflotation may be summed up in that the treated liquid had a light ammonium odour indicating that the liquid was not completely stripped of such compounds. It can be said however that the odours were greatly controlled through the embodiments of the process of the present invention.

The viscosity of the manure was also observed. The movement of the chemical additives and the electroflotation bubbles within the liquid influences the performance of the process. Most manure slurries act as pseudoplastic systems when obtained from the pit or pre-pit.

Referring to FIG. 3, the dynamic viscosity was measured in relation to the rate of shear, for different types of manure and at different dilution levels. The following Legend 1 shows what types of hog manure were used:

Legend 1:
A: Old manure 100%
B: Young manure 100%
C: Old manure 75%
D: Young manure 75%
E: Young manure 50% with coagulant
F: Young manure 50%
G: Old manure 50%
H: Young manure 25%
   Bio-treated manure 100%
   Old manure 25%
I: Water
   Bio-treated manure 75%
   Bio-treated manure 50%
   Bio-treated manure 25%

It should be noted that the old and young manures acted like pseudoplastic fluids at low dilution levels and required greater amounts of water so that they behaved as Newtonian fluids. The bio-treated raw manure behaved as a Newtonian fluid even at low dilution levels, in this case.

Referring to FIG. 4, the dynamic viscosity was measured in relation to the dilution level, for different types of manure and at different temperatures. The data are shown for rate of strain of 10 cycles/minutes only. The Legend 2 shows what types of manure were used:

Legend 2:
I: Old manure 50° C.
II: Old manure 40° C.
III: Old manure 30° C.
IV: Young manure 40° C.
V: Young manure 30° C.
VI: Young manure 50° C.
VII: Bio-treated manure 40° C.
VIII: Bio-treated manure 30° C.
IX: Bio-treated manure 50° C.

The temperature had a nominal effect on the viscosity of the old manure. By raising the temperature from 30° C. to 40° C., the viscosity increased by about 7%. The same variation in viscosity is obtained when the temperature is increased from 40° C. to 50° C. This trend suggests that a molecule (carbon hydrate and/or protein) may be causing the viscosity to increase. It is preferable in this embodiment of the process to maintain a temperature between about 15° C. and 30° C., and still preferably between 25° C. and 30° C. for the process steps.

Referring to FIGS. 6a and 6b, it can further be appreciated how a pretreated colloidal liquid (Fig. FIG. 6a) can undergo electroflotation to obtain exceptional solid-liquid separation (FIG. 6b).

Figure 7:
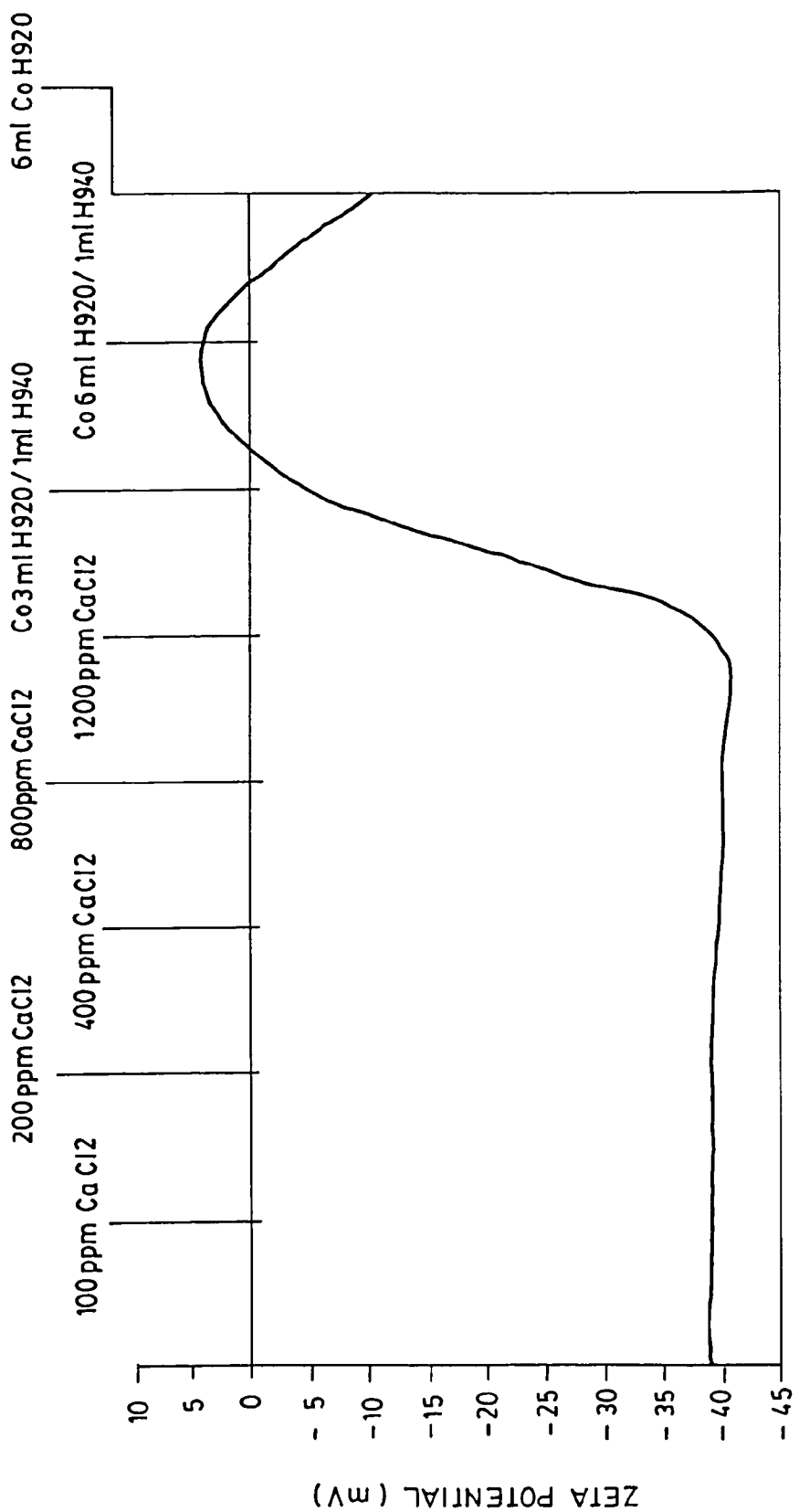
FIG. 7 is a graph of the relationship between certain additives and the zeta potential, for an embodiment of the present invention.

FIG. 7 shows the impact of increasing concentrations of $CaCl_2$, and coagulants HCC-920™ and HCC-940™ on the zeta potential of hog manure. The manure used in this experiment went through a 0.5 mm screen before being diluted to obtain a 50% suspension. The total COD was about 175 000 mg/L. The additives were then added to the manure (50%) in the concentrations appearing in the FIG. 7. The results show that the zeta potential is not affected by increasing concentration of $CaCl_2$. As soon as the coagulant agent was added, the zetal potential of the manure became closer to zeo, suggesting that the cationic polymers are adsorbing to the micelles' surface. At the concentration of 6ml/L of HCC-920198 and 1ml/L of Co HCC-940™, the zeta potential shows a positive value indicating that the micelles have been saturated.

The following tables show results for hog manure from nursery, maternity and fattening hogs, for a biofermented hog manure and for bovine manure from milking cows.

| Nursery hog manure | | | |
|---|---|---|---|
| | Manure source | | |
| Variables | Hog 1 Nursery | Hog 2 Nursery | Hog 3 Nursery |
| FTU | 12,939 50% | 21,350 25% | 79,164 20% |
| pH (adjected to) | 7.0* | 7.0* | 6.1 |
| calcium (ppm) | 19 | 6.65 | 35 |
| sodium (ppm) | 78.4 | 42.4 | 403 |
| potassium (ppm) | 488 | 495 | 1000 |
| solution 1 (a.c.) | 490 | 496 | 1000 |
| solution 2 (soluble salt) | 60 | 38 | 380 |

-continued

| Nursery hog manure | | | |
|---|---|---|---|
| | Manure source | | |
| Variables | Hog 1 Nursery | Hog 2 Nursery | Hog 3 Nursery |
| solution 3(insoluble saltl) | 120 | 76 | 760 |
| solution 4 (coagulant) | 4.0 ml/L | 4.1 ml/L | 6 ml/L |
| solution 5 (flocculant) | 0 ml/L | 0 ml/L | 2 ml/L |
| Result FTU | effective | 15 | 79 |

| Maternity hog manure | | | |
|---|---|---|---|
| Variables | Hog 4 Maternity | Hog 5 Mat-Fat | Hog 6 Mat-Fat |
| FTU | 23,833 45% | 29,374 50% | 29,374 80% |
| pH (adjected to) | 7.0* | 6.6 | 6.6 |
| calcium (ppm) | 10.2 | 62.5 | 36 |
| sodium (ppm) | 73.4 | 217 | 418 |
| potassium (ppm) | 463 | 404 | 1000 |
| solution 1 (a.c.) | 460 | 400 | 1000 |
| solution 2 (soluble salt) | 62 | 155 | 380 |
| solution 3(insoluble salt) | 124 | 310 | 760 |
| solution 4 (a.coag.) | 5.2 ml/L | 5 ml/L | 9 ml/L |
| solution 5 (a.floc.) | 0 ml/L | 2 ml/L | 3 ml/L |
| Results FTU | 43 | 30 | 89 |

| Fattening hog manure | | | | | |
|---|---|---|---|---|---|
| Variables | Hog 7 Fat | Hog 8 Fat | Hog 9 Fat | Hog 10 Fat | Hog 11 Fat |
| FTU | 63,503 25% | 46,990 25% | 37,920 30% | 42,220 50% | 42,220 50% |
| pH (adjusted to) | 6.5* | 6.8 | 7.1 | 6.7 | 6.8 |
| calcium (ppm) | 8.8 | 8.4 | 3.28 | 8.67 | 8.67 |
| sodium (ppm) | 191 | 273 | 49.7 | 374 | 374 |
| potassium (ppm) | 816 | 563 | 378 | 578 | 578 |
| solution 1 (a.c.) | 820 | 560 | 380 | 580 | 580 |
| solution 2 (soluble salt) | 180 | 265 | 44 | 360 | 360 |
| solution 3 (insoluble salt) | 360 | 530 | 88 | 720 | 720 |
| solution 4 (a.coag.) | 16 ml/L | 5.1 ml/L | 4.4 ml/L | 9 ml/L | 18 ml/L |
| solution 5 (a.floc.) | 3 ml/L | 0 ml/L | 0 ml/L | 3 ml/L | 3 ml/L |
| Results FTU | 182 | 25 | 0 | 202 | 205 |

| Bovine manure | |
|---|---|
| Variables | Bovine 1<br>Milking cow |
| FTU | n.d. |
|  | 30% |
| pH (adjusted to) | 6.2 |
| calcium (ppm) | 42 |
| sodium (ppm) | 59 |
| potassium (ppm) | 590 |
| solution 1 (a.c.) | 590 |
| solution 2 (soluble salt) | 0 |
| solution 3 (insoluble salt) | 0 |
| solution 4 (a.coa.) | 6 ml/L |
| solution 5 (a.floc.) | 2 ml/L |
| Results FTU | 34 |

Although the soluble and insoluble salts were not added for the bovine manure in this case, the initial concentration of calcium relative to sodium was in an operable range to obtain an efficient treatment. In manures with low calcium contents and/or high sodium content, the addition of soluble and insoluble salts, such as $CaCl_2$ and $CaCO_3$, will enable an efficient treatment.

It should of course be understood that the examples and embodiments described hereinabove are just that and do not limit the scope of what has actually been invented.

The invention claimed is:

1. A process for treating an animal husbandry effluent slurry comprising suspended solid particles, the process comprising the steps of:
   a) providing a liquid portion of the effluent slurry;
   b) assuring the liquid portion of step a) is diluted to a Newtonian fluid;
   c) assuring the pH of the Newtonian fluid obtained in step b) is under 10;
   d) adding to the fluid of step c):
      i) a soluble salt of alkaline earth metal; and
      ii) an insoluble basic salt of the same alkaline earth metal as step i);
      to balance available cations and promote agglomeration of the suspended solid particles in the fluid of step c);
   e) adding a cationic coagulant to obtain a pre-treated destabilized colloid mixture having a zeta potential of about zero; and
   f) subjecting the pre-treated mixture obtained in step e) to electroflotation to obtain a treated liquid and floated solids.

2. The process of claim 1, wherein step a) includes subjecting the effluent slurry to mechanical separation to obtain a rough solids portion and the liquid portion.

3. The process of claim 2, wherein in step a) the mechanical separation is performed by filtration using a mesh having 2 mm openings to remove the rough solids portion.

4. The process of claim 1, wherein the available cations comprise $Na^+$ and an alkaline earth metal cations, and the soluble salt is added in an amount so that the charge of the alkaline earth metal cations is from over equal to double the charge of the $Na^+$ cations.

5. The process of claim 4, wherein the soluble salt is added in an amount so that the charge of the alkaline earth metal cations is double the charge of the $Na^+$ cations.

6. The process of claim 4, wherein prior to step d) there is a step of determining the concentration of available cations.

7. The process of claim 6, wherein the step of determining the concentration of available cations is performed by ion specific electrodes to determine $Na^+$ and $Ca^{2+}$ concentrations and in step d) the soluble salt of alkaline earth metal is $CaCl_2$.

8. The process of claim 1, wherein in step d) there is a further step of adding a chelating agent before sub-steps i) and ii).

9. The process of claim 8, wherein the chelating agent is added to balance the concentration of $K^+$ present into the suspension.

10. The process of claim 1, wherein in step d) the insoluble basic salt is added in double the amount by weight as the soluble salt.

11. The process of claim 1, wherein in step d) the soluble salt of alkaline earth metal is $CaCl_2$ and the insoluble basic salt is $CaCO_3$.

12. The process of claim 1, wherein in step e) the coagulant is a cationic polymer of molecular weight between about 50,000 and about 200,000.

13. The process of claim 1, wherein in step e) after adding the cationic coagulant a cationic flocculant is added, in a proportion ranging between about 1:3 and about 1:30, to obtain the pre-treated destabilized colloid mixture having a zeta potential of about zero.

14. The process of claim 13, wherein the flocculant is cationic polymer of molecular weight over about 200,000 and is a polyacrylamide-based polymer.

15. The process of claim 1, wherein in step f) the electroflotation uses substantially non consumable electrodes.

16. The process of claim 15, wherein the electrodes comprise an anode and a cathode, the anode being in the form of rods and the cathode being in the form of a flat mesh, wherein the anode is arranged about 9 mm below the cathode in spaced and parallel relation thereto.

17. The process of claim 16, wherein the current density used for the electroflotation is between about 25 and about 65 $mA/cm^2$.

18. The process of claim 2, further comprising after step e) and before step f) the additional step of:
   letting the pre-treated mixture rest at a constant temperature.

19. The process of claim 18, wherein the pre-treated mixture is let to rest at a temperature between about 25° C. and about 30° C. for at least about 20 minutes.

20. The process of claim 1, wherein the effluent slurry contains organic matter up to about 225,000 mg/L as TCOD and the process is performed by batch.

21. The process of claim 1, wherein the steps a) to e) are performed at a temperature of about 15° C.

22. The process of claim 1, wherein the animal husbandry effluent slurry is hog manure.

23. The process of claim 22, wherein the hog manure is taken from a pre-pit.

24. The process of claim 1, wherein in step c) the pH is adjusted by adding an organic acid.

25. The process of claim 24, wherein in step c) the organic acid is acetic acid and the pH is adjusted to between about 6 and about 7.

* * * * *